United States Patent
Jung et al.

(10) Patent No.: US 8,233,780 B2
(45) Date of Patent: Jul. 31, 2012

(54) REPRODUCING APPARATUS AND METHOD, AND RECORDING MEDIUM

(75) Inventors: Kil-soo Jung, Gyeonggi-do (KR); Seong-jin Moon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1029 days.

(21) Appl. No.: 11/435,872

(22) Filed: May 18, 2006

(65) Prior Publication Data
US 2006/0203296 A1    Sep. 14, 2006

Related U.S. Application Data

(63) Continuation of application No. 10/791,284, filed on Mar. 3, 2004.

(60) Provisional application No. 60/458,436, filed on Mar. 31, 2003.

(30) Foreign Application Priority Data

Mar. 28, 2003  (KR) ................................ 2003-19684
Nov. 19, 2003  (KR) ................................ 2003-82336

(51) Int. Cl.
*H04N 5/92*       (2006.01)
*H04N 1/00*       (2006.01)
*H04N 5/78*       (2006.01)
*H04N 5/84*       (2006.01)
*H04N 5/928*      (2006.01)
*G06F 1/00*       (2006.01)
*G06F 9/26*       (2006.01)
*G06F 12/02*      (2006.01)
*G06F 13/00*      (2006.01)

(52) U.S. Cl. ........ 386/337; 386/324; 386/334; 386/338; 386/339; 345/565; 358/426.12; 711/103; 711/156; 711/166; 711/168; 711/219; 713/501

(58) Field of Classification Search .................... 386/98, 386/95, 96, 104, 126, E9.013, E9.017, E9.04; 348/E13.04, E13.059, E13.073, E5.011, E5.108; 358/426.12; 375/E7.271; 713/501; 345/512, 345/515, 565; 711/103, 156, 166, 168, 219
See application file for complete search history.

(56) References Cited

U.S. PATENT DOCUMENTS
5,966,496 A    10/1999  Takimoto
(Continued)

FOREIGN PATENT DOCUMENTS
EP    1 041 566    10/2000
(Continued)

OTHER PUBLICATIONS

Office Action issued in corresponding Japanese Patent Application No. 2006-507774 dated Nov. 13, 2007.
(Continued)

*Primary Examiner* — Thai Tran
*Assistant Examiner* — Syed Hasan
(74) *Attorney, Agent, or Firm* — NSIP Law

(57) ABSTRACT

A reproducing apparatus and method includes a reproducing unit to reproduce mainstream data and sub audio data separately added in the mainstream data, wherein the reproducing unit comprises a counter used in reproducing the sub audio data. Accordingly, it is possible to more naturally reproduce still image data, such as a browsable slide show, to which sub audio data is additionally included, thus preventing an interruption in reproduction of the sub audio data even during a forward or reverse play.

7 Claims, 9 Drawing Sheets

U.S. PATENT DOCUMENTS

| | | | |
|---|---|---|---|
| 6,101,591 A * | 8/2000 | Foster et al. ................. | 711/219 |
| 6,122,436 A * | 9/2000 | Okada et al. ................. | 386/126 |
| 6,404,925 B1 | 6/2002 | Foote et al. | |
| 6,470,460 B1 * | 10/2002 | Kashiwagi et al. ........... | 713/501 |
| 6,574,419 B1 | 6/2003 | Nonomura et al. | |
| 6,788,880 B1 | 9/2004 | Fuchigami et al. | |
| 2001/0000809 A1 | 5/2001 | Ando et al. | |
| 2002/0033889 A1 | 3/2002 | Miyazaki | |
| 2002/0145702 A1 * | 10/2002 | Kato et al. .................... | 352/1 |
| 2003/0108338 A1 * | 6/2003 | Nonomura et al. ............ | 386/95 |
| 2003/0223735 A1 | 12/2003 | Boyle | |
| 2004/0109677 A1 | 6/2004 | Seo et al. | |
| 2004/0184778 A1 | 9/2004 | Jung et al. | |

FOREIGN PATENT DOCUMENTS

| | | |
|---|---|---|
| EP | 0 949 825 B1 | 11/2000 |
| JP | 07-007730 | 1/1995 |
| JP | 2000-298498 | 10/2000 |
| JP | 2002-288942 | 10/2002 |
| JP | 2003-6979 | 1/2003 |
| JP | 2003-348442 | 12/2003 |
| JP | 2004-336566 | 11/2004 |
| JP | 2006-507738 A | 3/2006 |
| JP | 2006-522554 | 9/2006 |
| JP | 2006-522554 A | 9/2006 |
| KR | 1999-76457 | 10/1999 |
| KR | 10-0300977 | 6/2001 |
| MX | PA04011595 A | 3/2005 |
| WO | WO 00/55857 | 9/2000 |
| WO | WO 01/55857 A2 | 8/2001 |
| WO | WO 02/069631 | 9/2002 |
| WO | WO 02/075739 | 9/2002 |
| WO | WO 2004/075194 A1 | 9/2005 |

OTHER PUBLICATIONS

Office Action issued in corresponding Japanese Patent Application No. 2006-182274 dated Nov. 13, 2007.
Office Action issued in the Canadian Intellectual Property Office on Jun. 10, 2009.
Australian Search Report and Written Opinion dated Jul. 23, 2009, issued in the Singapore Patent Application No. 200606347-3.
Russian Decision on Grant issued on May 6, 2010, in corresponding Russian Application No. 2006118102 (12 pages).
Taiwanese Office Action issued on Aug. 24, 2010, in corresponding Taiwanese Patent Application No. 95118728 (6 pages).
Taiwanese Office Action issued on Sep. 2, 2010, in corresponding Taiwanese Patent Application No. 95118727 (5 pages).
Indian Office Action issued on Sep. 20, 2010, in corresponding Indian Patent Application No. 2840/DELNP/2006 (2 pages).
Taiwanese Office Action issued on Aug. 5, 2011, in counterpart Taiwanese Patent Application No. 95118728 (11 pages including English translation).
U.S. Appl. No. 10/791,284, filed Mar. 3, 2004, Kil-soo Jung et al., Samsung Electronics Co., Ltd.
U.S. Appl. No. 10/921,256, filed Aug. 19, 2004, Kil-soo Jung et al., Samsung Electronics Co., Ltd.
U.S. Appl. No. 11/435,872, filed May 18, 2006, Kil-soo Jung et al., Samsung Electronics Co., Ltd.
Notice of Preliminary Reexamination dated on Jan. 4, 2012, in corresponding Japanese Patent Application No. 2008-32329 (4 pages).
Notice of Preliminary Reexamination dated on Jan. 4, 2012, in corresponding Japanese Patent Application No. 2008-32330 (4 pages).

* cited by examiner

REPRODUCING APPARATUS AND METHOD, AND RECORDING MEDIUM

CROSS-REFERENCE TO RELATED APPLICATIONS

This application is a continuation of U.S. application Ser. No. 10/791,284 filed on Mar. 3, 2004 which claims the benefit of Korean Patent Application No. 2003-19684 filed on Mar. 28, 2003, Korean Patent Application No. 2003-82336 filed on Nov. 19, 2003, and U.S. Provisional Patent Application No. 60/458,436 filed on Mar. 31, 2003, the disclosures of which are incorporated herein in their entirety by reference.

BACKGROUND OF THE INVENTION

1. Field of the Invention

The present invention relates to a reproducing apparatus and method, and more particularly, to a reproducing apparatus and method for reproducing still image data, such as a browsable slide show, to which sub audio data is separately added, and a recording medium therefor.

2. Description of the Related Art

Because moving picture data is very large, the picture data needs to be compressed using time-space compression to be encoded for easy transmission. In general, to be recorded on an information storage medium, video data is compressed and encoded under the Motion Picture Expert Groups (MPEG) standards, prescribed by both the International Organization for Standardization (ISO) and the International Electrotechnical Commission (IEC), whereas audio data is compressed under the MPEG standards or is converted into digital data using linear Pulse Code Modulation (PCM). Time information, necessary for synchronizing the encoded video data and audio data with each other, is incorporated into system multiplexed data. In this case, the MPEG2 standard is also frequently used when encoding data.

The system multiplexing can be performed using packets. For example, as shown in FIG. 1, when multiplexing of video data and audio data, the video data and audio data are divided in bitstream packets of predetermined lengths, additional information such as a header is included in the bitstream packets, and video packets and audio packets are mixed and transmitted using time-sharing techniques. Therefore, a start of a packet, i.e., a header, includes information indicating whether the packet is a video packet or an audio packet.

Meanwhile, time information called time stamp is used in synchronization between audio and video packets according to the MPEG standards.

The time stamp is a type of time management tag that is provided in access units for a decoding process required for data reproduction. That is, the time stamp is information that specifies when audio or video data must be decoded and reproduced in access units. There are two types of time stamps: Presentation Time Stamp (PTS) and Decoding Time Stamp (DTS).

The PTS is time management information of data reproduction selected depending on an MPEG coding method adopted, when a System Time Clock (STC), e.g., a reference synchronization signal, which is generated in a reference decoder of an MPEG system is equivalent to a PTS, related audio or video data is reproduced and output in access units.

The DTS is time management information of data decoding. The MPEG standards require the DTS because a sequence of delivering encoded video bitstreams is unique. For example, since an I frame picture and a P frame picture are delivered as encoded bitstreams before a B frame picture, sequences of decoding and reproducing the I and P frame pictures are different from those of decoding and reproducing the B frame picture. If the PTS and the DTS are not the same, they are sequentially included in the packet data. If they are the same, only the PTS is included in the packet data.

Hereinafter, conventional MPEG encoding and decoding apparatuses will be described with reference to FIGS. 2 through 6.

FIG. 2 illustrates a conventional hierarchical encoding apparatus 200 used in MPEG encoding. Referring to FIG. 2, a video encoder 210 receives and encodes digital video data, and an audio encoder 220 receives and encodes digital audio data.

A first packetizer 230 packetizes the encoded video data output from the video encoder 210 by dividing it in predetermined units and generates Packetized Elementary Streams (PESs). A second packetizer 240 packetizes the encoded audio data output from the audio encoder 220 by dividing it in predetermined units and generates PESs.

Encoding time information such as the PTS and the DTS may be incorporated into the PES. Such encoding time information is used to synchronize the PES with other data. In particular, the DTS indicates when an image is decoded and the PTS indicates when an image is output. In general, only the PTS is included in the audio data. In this case, the DTS is regarded as being the same as the PTS. After the inclusion of the PTS and the DTS, the audio data or video data is packetized in a payload data format.

A program stream multiplexer 250 multiplexes the video PES packetized by the first packetizer 230 into a program stream (PS). A transport stream multiplexer 260 multiplexes the audio PES packetized by the second packetizer 240 into a transport stream (TS). In multiplexing, each PES is divided into predetermined units, identification numbers are allocated to the predetermined units, and the PES is then multiplexed.

The program stream (PS) is made for information storage media and multiplexed in PS packet units. In a DVD Video standard, a representative application for moving image storage media, a PS packet unit of 2048 bytes is used.

The TS is used in an application, such as digital broadcasting, where data loss is unavoidable. The TS is multiplexed into TS packet units. A TS packet unit is fixed to be 188 bytes long. Recently, the use of a TS when recording digital broadcast data on a storage medium has been increased. In this disclosure, the TS is used in multiplexing but the PS also can be used.

As described above, the TS is packetized data, such as video or audio data, which is divided in predetermined units so that the data can be transmitted via a satellite, a cable, or a Local Area Network (LAN). Here, the predetermined unit is 188 bytes long, when using the MPEG-2 transmission stream according to the ISO/IEC 13818-1 standard, and 53 bytes long, when using the Asynchronous Transfer Mode (ATM).

In digital broadcasting, packet data is transmitted at variable time intervals. The transmitted packet data is input to a buffer of a receiving apparatus having a decoder, decoded by the decoder, and broadcasted so that a user can view digital broadcasting. The packet data can be temporarily stored on a recording medium and reproduced at a desired time. In this case, the variable time intervals at which the packet data was transmitted is significant when the packet data is input to a decoder of a reproducing apparatus. This is because a transmitting side transmits the packet data to a receiving side while adjusting time intervals between transmissions of the packet data, in consideration of the state of the buffer of the receiving apparatus having the decoder. If the variable time intervals are not adhered to, the buffer at the receiving apparatus overflows or underflows. Therefore, information regarding arrival times of the respective packet data transmitted to the recording apparatus is inserted in all packets, and the packet data is reproduced based on the information regarding the arrival times.

As described above, arrival time stamps (ATSs), which are the information regarding the arrival times of data, are required for proper data reproduction when packet data transmitted in TS format is recorded on a recording medium and reproduced from the recording medium.

In other words, a recording apparatus receives packet data sent by a transmitting side at particular time intervals and records it on a recording medium. To reproduce the recorded packet data, a counter is required to transmit the packet data to a decoder of a reproducing apparatus at the same time intervals as the particular time intervals used by the transmitting side. The counter operates in response to a system clock at 90 kHz or 27 kHz, and includes a counter value inserted into the packet data, the counter being an ATS obtained at an instant of time a packet is input to the counter. To reproduce the recorded packet data, the time intervals at which the packet data will be transmitted to the buffer of the decoder are determined by the counter value included in the packet data. Such a counter is called an arrival time clock (ATC) counter. That is, an ATS is added into the input packet data based on the counter value generated by the ATC counter, and the packet data is output based on the ATS for data reproduction.

FIG. 3 illustrates a data structure of packet data including ATSs specifying arrival times of the packet data to a receiving side, and a connection between the ATSs and data output time when the packet data is reproduced. Referring to FIG. 3, when packet data A, B, C, and D are received at arrival times 100, 110, 130, and 150, respectively, a recording apparatus makes ATSs indicating the arrival times 100, 110, 130, and 150 and inserts the ATSs into the packet data A, B, C, and D. For data reproduction, the packet data is output and reproduced based on the ATSs. That is, the packet data A is output at the output time 100, the packet data B is output at the output time 110, the packet data C is output at the output time 130, and the packet data D is output at the output time 150.

FIG. 4 illustrates a data structure of packet data 400 including ATSs which is recorded on a recording medium. For convenience, FIG. 4 illustrates the packet data 400 to include information, such as an ATS 410, a decoding time stamp (DTS) 420, a presentation time stamp (PTS) 430, and audio/video (AV) data 440, according to the present invention.

FIG. 5 illustrates a part of a reproducing apparatus 500 that reproduces packet data including ATSs as shown in FIG. 4. The recording apparatus 500 includes a disc driving unit 510, a buffer 520, a source depacketizer 530, and an ATC counter 540.

The disc driving unit 510 reads the packet data including the ATSs and transmits the packet data to the buffer 520.

The buffer 520 receives the packet data including the ATSs and transmits it to the source depacketizer 530.

The ATC counter 540 is used when a data stream stored in a recording medium is transmitted to a decoder (not shown) at intervals of time at which the packet data has first been transmitted from a receiving side. The ATC counter 540 operates in response to a system clock at 90 kHz or 27 kHz, resets an ATS value, which is obtained at an instant of time when a first packet in a TS format is input to the source depacketizer 530, as an initial value, and continues counting ATSs of input packets. When an ATS of an input packet is equivalent to a counting value generated by the ATC counter 540, the ATS is removed from the input packet and the input packet is sent to the decoder.

In other words, the ATC counter 540 sets the ATS value of the first input packet transmitted to the source depacketizer 530 as the initial value and begins counting. Next, the source depacketizer 530 checks ATS values of next packet data to itself, removes an ATS value from packet data whose ATS value is equivalent to the counting value generated by the ATC counter 540, and transmits the packet data to the decoder.

For example, in the case of the packet data of FIG. 3, since a value of the ATS of a first packet data is 100, an initial value of the ATC counter 540 is set as 100 and the ATC counter 540 continues counting. The ATS is removed from the first packet data and the first packet data is transmitted to the decoder. Next, since a value of the ATS of second packet data is 110, the source depacketizer 530 removes the ATS from the second packet data and transmits the second packet data to the decoder, when a counting value of the ATC counter 540 is 110. The process is also applied to the other packet data in a similar manner.

FIG. 6 is a block diagram of a conventional standard decoder 600 used for data synchronization based on encoded time information such as a PTS and a DTS. Referring to FIG. 6, the decoder 600 includes a demultiplexer 610, a video decoder 620, a system time clock (STC) counter 630, an audio decoder 640, and a graphics processor 650.

The demultiplexer 610 demultiplexes multiplexed video packet data, audio packet data, and sub-picture packet data, and sends the demultiplexed video packet data and audio packet data to the video decoder 620 and the audio decoder 640, respectively. The demultiplexed sub-picture may be subtitle data that is displayed to be overlapped with the video packet data. In FIG. 6, a decoder that decodes the sub-picture data is not illustrated.

The STC counter 630 operates at 90 KHz or 27 KHz and controls a value of a packet, which is obtained at an instant of time when the packet is input to a buffer (not shown) of the decoder, to be equivalent to a program clock reference (PCR) value of the packet. The buffer temporarily stores packet data that is output from the demultiplexer 610 but has yet to be input to the video decoder 620. The PCR denotes a program clock reference that is information used to adjust a value of an STC counter, which is a reference time value, to a value set by an MPEG decoding apparatus with video and audio decoders.

A process of decoding packet data including DTSs and PTSs will be described with reference to FIG. 6. First, the demultiplexer 610 demultiplexes an input transport packet into the original video packet data and audio packet data and sends the video packet data and the audio packet data to the video decoder 620 and the audio decoder 640, respectively.

Next, the STC counter 630 is set based on PCR information (not shown) contained in the packet data. The video packet data is input to the video decoder 620 by the set STC counter 630 at a DTS time and decoded by the video decoder 620. Because the audio packet data has only a PTS value, the audio packet data is input to the audio decoder 640 at a PTS time, decoded by the audio decoder 640, and output.

Next, the decoded video packet data output from the video decoder 620 is input to the graphics processor 650 by the STC counter 630 based on the PTS time, processed by the graphics processor 650, and output as video data.

As described above, the audio and video packet data can be synchronized with each other by controlling the decoding and outputting of the audio and video packet data at the PTS time and the DTS time, using a counting value generated by the STC counter 630. That is, the audio and video packet data are decoded and synchronized with each other, in response to a clock generated by the STC counter 630.

In general, there are two applications of still images. First, there is a slide show wherein still images are output at predetermined times. That is, a user reproduces still images using a reverse play where a previous image is reproduced again or a forward play where reproduction of a current image is skipped and a next image is reproduced. When an STC value is updated with a new value, images can be sequentially reproduced again. If audio data is included in a still image, the audio data is reproduced in synchronization with a newly updated still image. Thus, the reproduction of the audio data is discontinued, and the audio data is reproduced again starting from a portion of the audio data corresponding to a new still image.

Second, there is a browsable slide show. In the browsable slide show, reproduction of audio data must not be discontinued even during the reverse play or the forward play. For instance, the slide show is reproduced as if leafing through the files of a album to view included photos. On the other hand, during reproduction of the browsable slide show with background music, seamless reproduction of the background music is required for natural reproduction of still images even if a user selects and reproduces an image preceding or following a current image.

Hereinafter, problems with the forward or reverse play of the browsable slide show will be described with reference to FIG. 7. Still images, such as the browsable slide show, are divided into mainstream data and sub audio data. In general, the mainstream data includes video data, audio data, and sub-picture data, but the video data in a browsable slide show application must be understood as still image data excluding audio data. The sub audio data indicates audio data that is additionally made separately from the mainstream data and is reproduced as background music during reproduction of the still image data.

Referring to FIG. 7, each still image and sub audio data is synchronized using PTS information, that is, encoding time information. As data reproduction proceeds, an STC counter value of a decoder (not shown) is increased and a normal play is performed in accordance with the increased STC counter value. However, when a user wants to perform the reverse or forward play, the STC counter value is readjusted based on a target position of the reverse or forward play (e.g., 3000 and 20000). If the STC counter value is updated, the STC counter is reset to 10000 to restore both the original still image and the original sub audio, thereby causing an interruption in sub audio data, i.e., background music.

As described above, a conventional reproducing apparatus controls both a video decoder and an audio decoder using an STC counter. Therefore, when the conventional reproducing apparatus is used to reproduce still images using an application such as a browsable slide show, it is difficult to prevent an interruption in reproduction of background music when an STC value is readjusted during a reverse or forward play. In this case, the browsable slide show cannot be reproduced smoothly and might cause a harsh grating noise.

SUMMARY OF THE INVENTION

The present invention provides an apparatus and method for reproducing still image data, such as a browsable slide show, to which sub audio data is additionally included, without interrupting reproduction of the sub audio data, i.e., background music, even during a forward or reverse play, and a recording medium therefor.

According to an aspect of the present invention, there is provided a reproducing apparatus comprising a reproducing unit to reproduce mainstream data and sub audio data separately added in the mainstream data, wherein the reproducing unit comprises a counter used in reproducing the sub audio data.

Additional aspects and/or advantages of the invention will be set forth in part in the description which follows and, in part, will be obvious from the description, or may be learned by practice of the invention.

In an aspect of the present invention, the counter includes a sub audio arrival time clock (ATC) counter that is used to depacketize the sub audio data.

In another aspect of the present invention, the counter comprises a sub audio system time clock (STC) counter that is used to decode the depacketized sub audio data.

In an aspect of the present invention, the mainstream data includes still image data.

According to another aspect of the present invention, there is provided a reproducing apparatus including a mainstream reproducing unit to reproduce mainstream data including still image data, using a clock for mainstream data; and a sub audio reproducing unit to reproduce sub audio data separately added into the mainstream data, using a clock for sub audio data.

According to another aspect of the present invention, the mainstream reproducing unit includes a mainstream depacketizer that depacketizes the mainstream data; and a mainstream ATC counter that provides a clock used in depacketizing the mainstream data with the mainstream depacketizer. The sub audio reproducing unit includes a sub audio depacketizer that depacketizes the sub audio data; and a sub audio ATC counter that provides a clock used in depacketizing the sub audio data with the sub audio depacketizer.

According to another aspect of the present invention, the mainstream reproducing unit includes a mainstream decoder that decodes the mainstream data output from the mainstream depacketizer; and a mainstream STC counter that provides a clock used in decoding the mainstream data with the mainstream decoder. The sub audio reproducing unit includes a sub audio decoder that decodes the sub audio data output from the sub audio depacketizer; and a sub audio STC counter that provides a clock used in decoding the sub audio data with the sub audio decoder.

According to yet another aspect of the present invention, there is provided a reproducing method comprising reproducing sub audio data, separately added into mainstream data, using a clock for reproducing the sub audio data.

In an aspect of the present invention, the reproducing sub audio data includes depacketizing the sub audio data using a clock depacketizing the sub audio data.

In an aspect of the present invention, the reproducing sub audio data includes decoding the sub audio data using a clock decoding the depacketized sub audio data.

According to still another aspect of the present invention, there is provided a reproducing method including reproducing mainstream data including still image data using a clock reproducing the mainstream data; and reproducing sub audio data, which is separately added in the mainstream data, using a clock reproducing the sub audio data.

In an aspect of the present invention reproducing mainstream data includes depacketizing the mainstream data using a clock depacketizing the mainstream data; and decoding the mainstream data using a clock decoding the depacketized mainstream data.

In an aspect of the present invention reproducing sub audio data includes depacketizing the sub audio data using a clock depacketizing the sub audio data; decoding the sub audio data using a clock decoding the depacketized sub audio data.

According to still another aspect of the present invention, there is provided a computer readable recording medium storing a program executing a reproducing method, wherein the reproducing method comprises reproducing sub audio data separately added in mainstream data, using a clock reproducing the sub audio data.

According to still another aspect of the present invention, there is provided a computer readable recording medium storing a program executing a reproducing method, wherein the reproducing method comprises reproducing mainstream data including still image data using a clock reproducing the mainstream data; and reproducing sub audio data separately added into the mainstream data using a clock reproducing the sub audio data.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
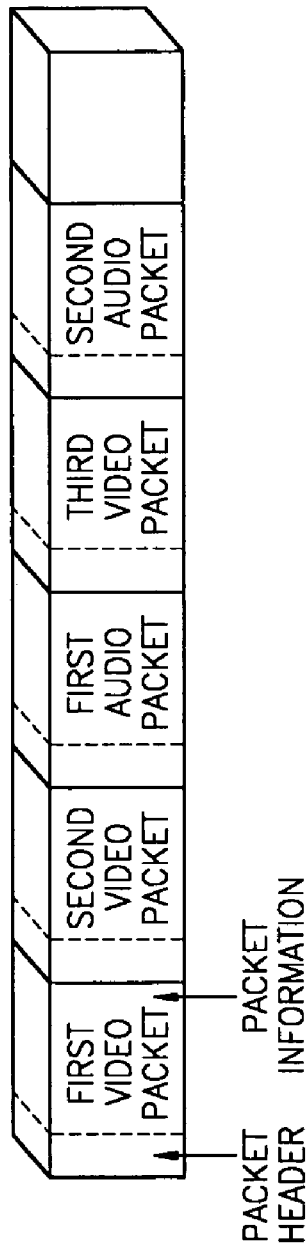
FIG. 1 illustrates a conventional data structure of multiplexed packet data.
Figure 2:
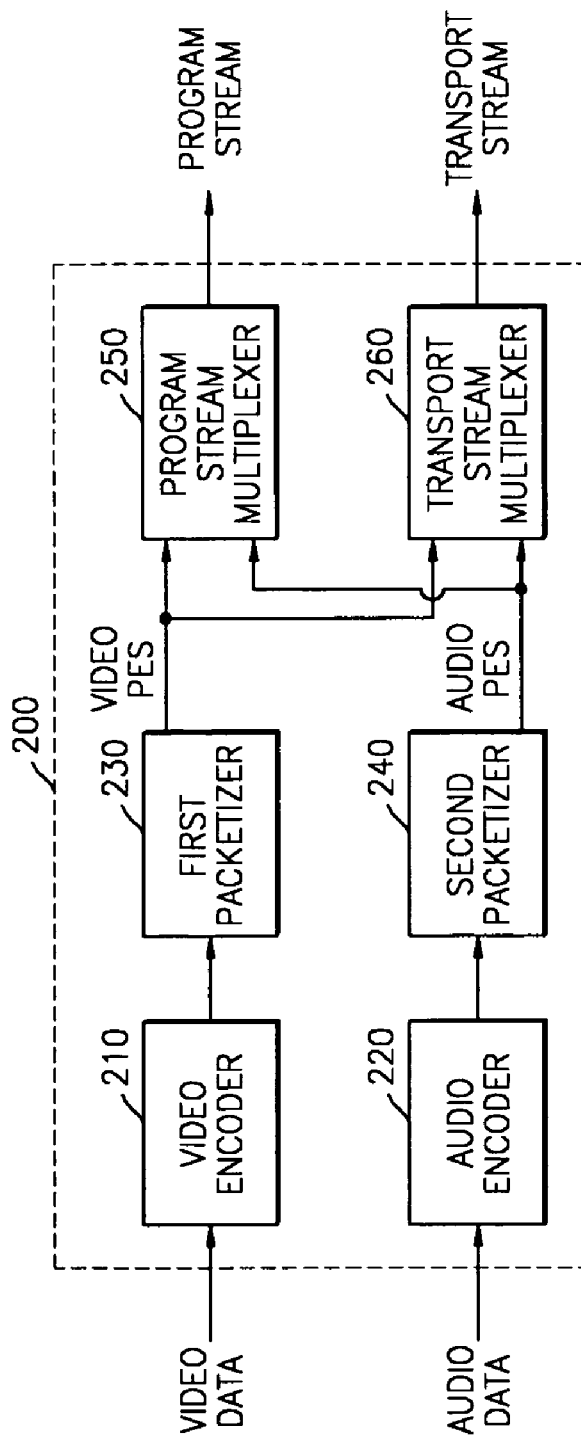
FIG. 2 illustrates a conventional hierarchical encoding apparatus for MPEG encoding.
Figure 3:
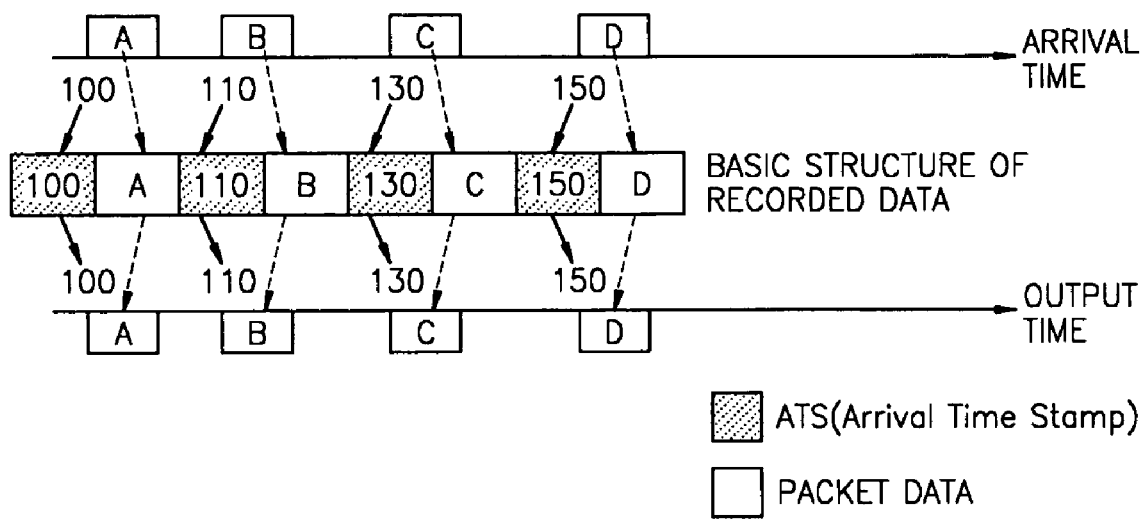
FIG. 3 illustrates a conventional data structure of packet data including arrival time stamps (ATSs) and a connection between the ATSs and data output time when the packet data is reproduced.
Figure 4:
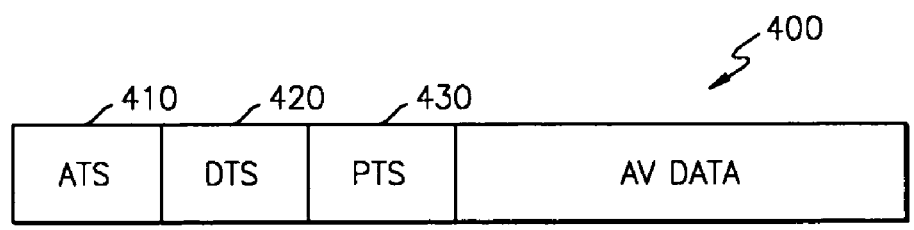
FIG. 4 illustrates a conventional data structure of packet data including time synchronization information.
Figure 5:
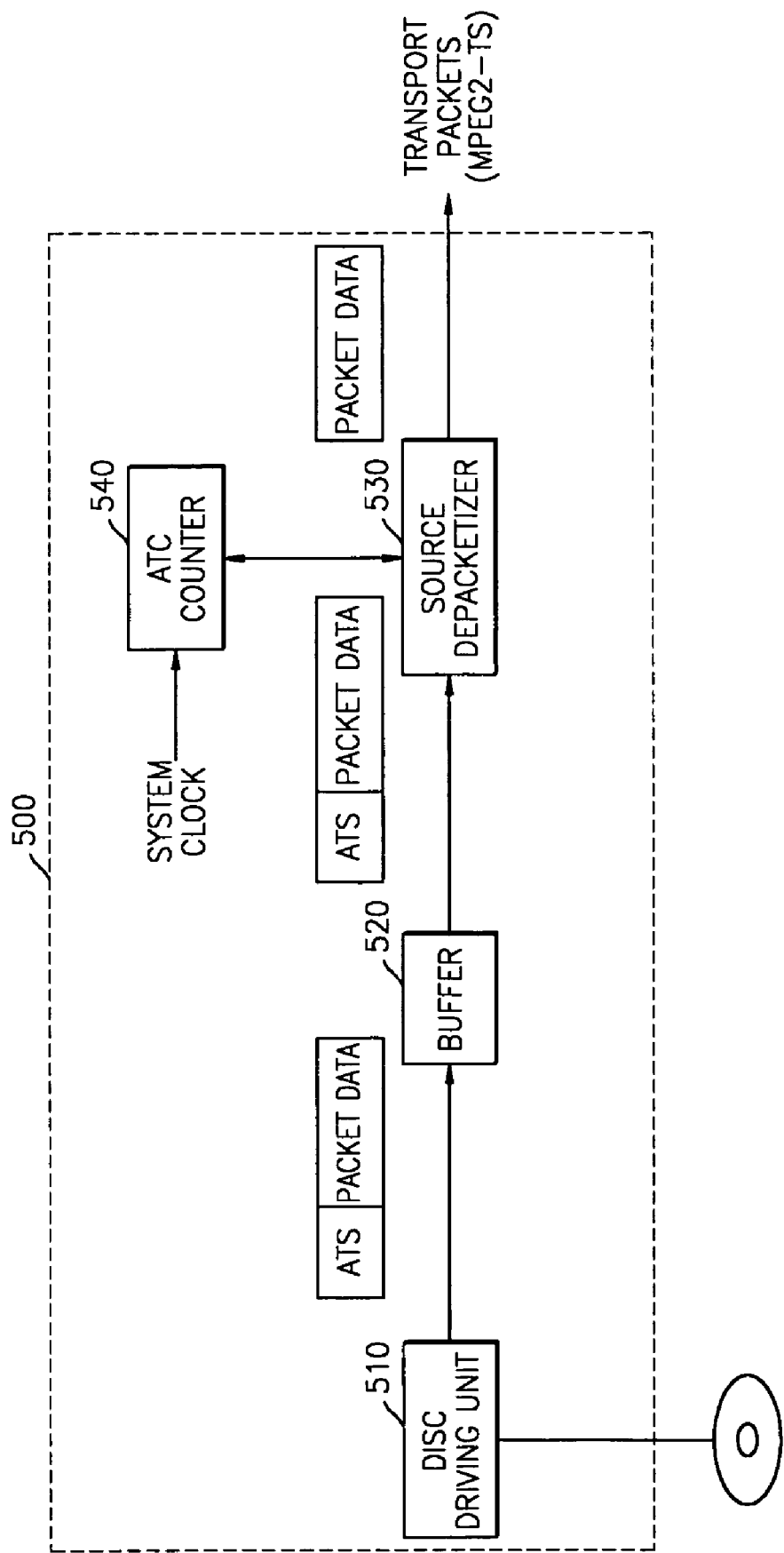
FIG. 5 illustrates a part of a conventional reproducing apparatus that reproduces packet data including ATSs.
Figure 6:
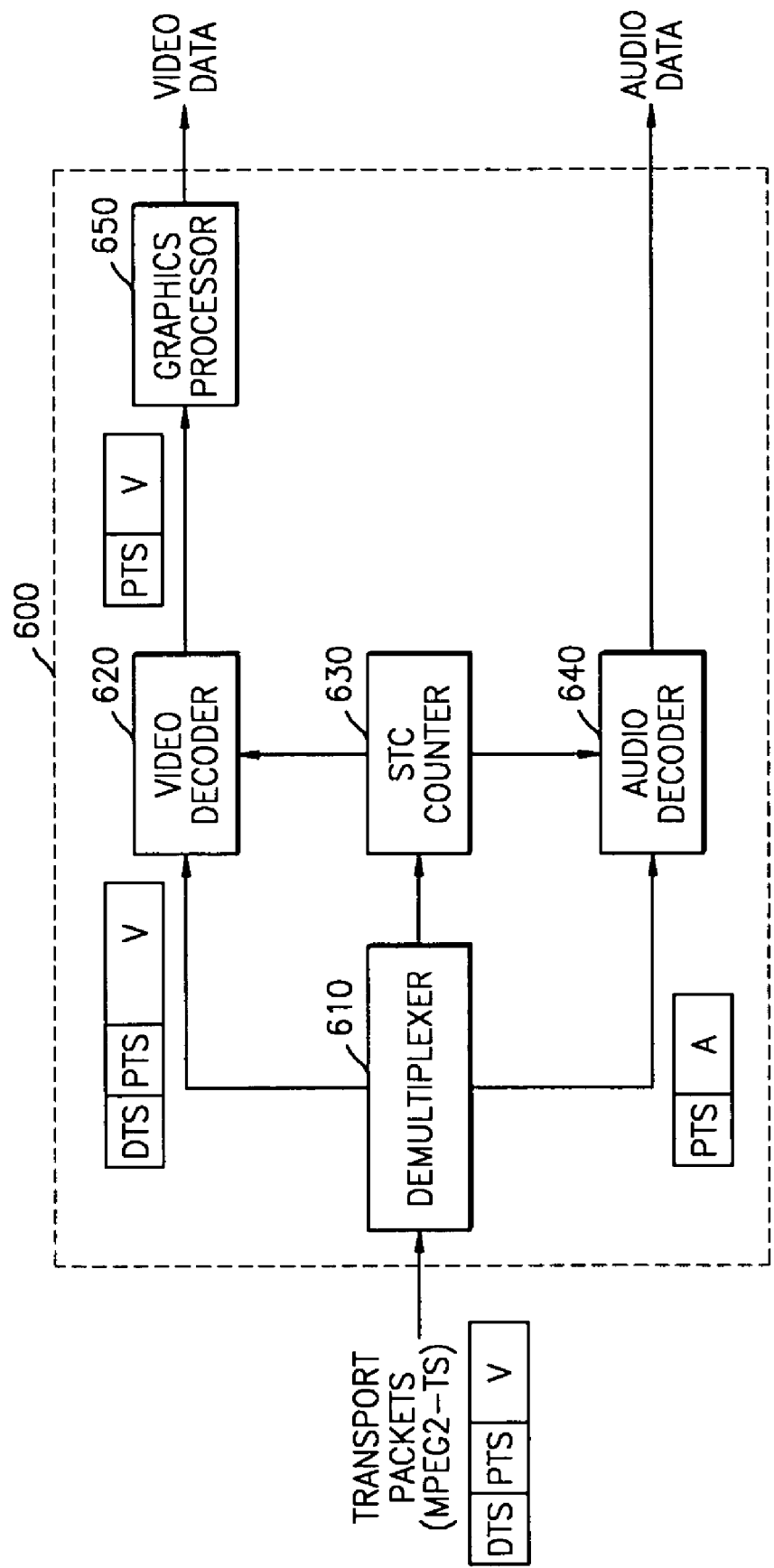
FIG. 6 is a block diagram of a part of a standard decoder included in a conventional reproducing apparatus.
Figure 7:
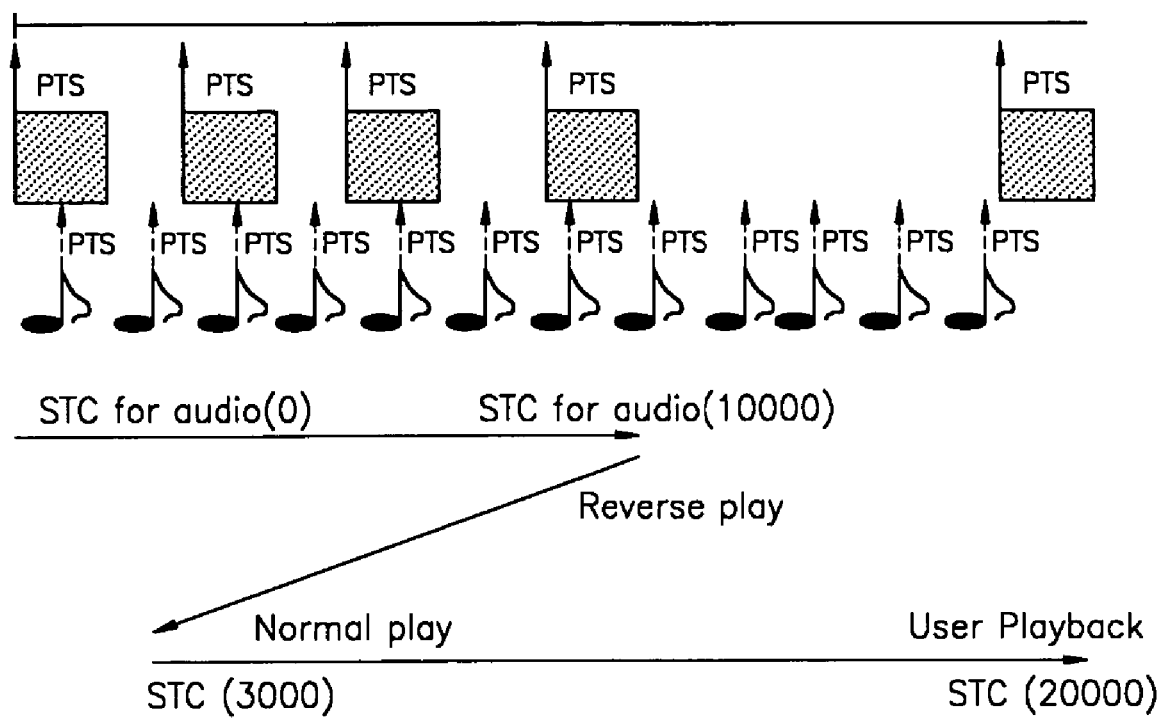
FIG. 7 illustrates a conventional method of resetting a system time clock (STC) when reproducing a browsable slide show.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 8:
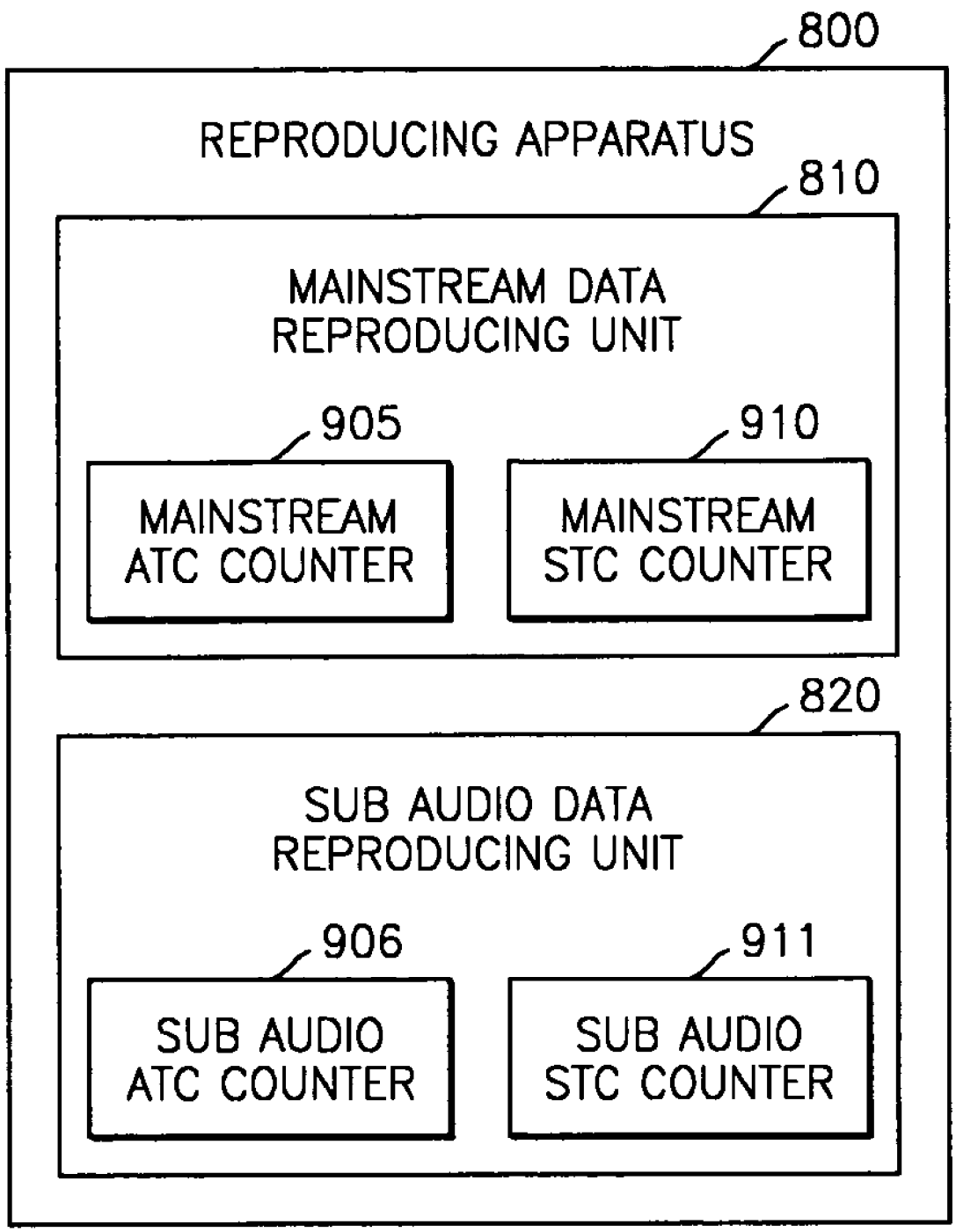
FIG. 8 is a schematic block diagram of a reproducing apparatus according to an embodiment of the present invention.

FIG. 8 is a block diagram illustrating a reproducing apparatus 800 according to an embodiment of the present invention. The reproducing apparatus 800 includes a mainstream data reproducing unit 810 and a sub audio data reproducing unit 820.

The mainstream data reproducing unit 810 reproduces mainstream data using a clock, and includes a mainstream arrival time clock (ATC) counter 905 and a mainstream system time clock (STC) counter 910.

The sub audio data reproducing unit 820 reproduces sub audio data using a clock, and includes a sub audio ATC counter 906 and a sub audio STC counter 911.

A structure of the reproducing apparatus 800 will be described in detail with reference to FIG. 9. As described above, the reproducing apparatus 800 reproduces mainstream data using a clock for mainstream data and reproduces sub audio data using a clock for sub audio data. Therefore, even if the clock for mainstream data is adjusted, the clock for sub audio data is not affected by the adjustment, thus enabling seamless reproduction of sub audio data.

The structure of a reproducing apparatus 900 such as that shown in FIG. 8 will now be described with reference to FIG. 9. The reproducing apparatus 900 includes a disc driving unit 901, a mainstream buffer 902, a sub audio buffer 903, a first source depacketizer 904, a mainstream ATC counter 905, a sub audio ATC counter 906, a second source depacketizer 907, a demultiplexer 908, a mainstream decoder 909, a mainstream STC counter 910, a sub audio STC counter 911, a sub audio decoder 912, and a graphics processor 913.

The disc driving unit 901 reads packet data including arrival time stamps (ATSs) from a recording medium 914, transmits mainstream packet data including still image data from the packet data to the mainstream buffer 902, and transmits sub audio packet data to the sub audio buffer 903.

The first source depacketizer 904 receives the mainstream packet data from the mainstream buffer 902, depacketizes the mainstream packet data, and sends the depacketized mainstream data to the demultiplexer 908. More specifically, the first source depacketizer 904 transmits the depacketized mainstream data, from which the ATSs are detached, to the demultiplexer 908 at predetermined time intervals, based on ATS information added to the mainstream packet data by the mainstream ATC counter 905.

The mainstream ATC counter 905 controls the first source depacketizer 904 to send the depacketized mainstream data to the demultiplexer 908 at the predetermined time intervals. More specifically, the mainstream ATC counter 905 is initialized based on an ATS value of the first mainstream packet data input to the first source depacketizer 904, and starts counting at the same time. When a counting value of the mainstream ATC counter 905 is equivalent to a value of an ATS of a second mainstream packet data input to the first source depacketizer 904, the first source depacketizer 904 depacketizes the second mainstream packet data and sends the depacketized mainstream data to the demultiplexer 908.

The operations of the second source depacketizer 907 and the sub audio ATC counter 906 are the same as those of the first source depacketizer 904 and the mainstream ATC counter 905, respectively.

The second source depacketizer 907 receives a sub audio packet data from the sub audio buffer 903, depacketizes the sub audio packet data, and outputs the depacketized sub audio data to the sub audio decoder 912. More specifically, the second source depacketizer 907 outputs the depacketized sub audio data, from which ATSs are detached, at predetermined time intervals, based on ATS information added to the sub audio packet data by the sub audio ATC counter 906.

The sub audio ATC counter 906 controls the second source depacketizer 907 to output the sub audio packet data at the predetermined time intervals. More specifically, the sub audio ATC counter 906 is initialized based on an ATS value of a first sub audio packet data input to the second source depacketizer 907, and the sub audio ATC counter 906 starts counting at the same time. When a counting value of the sub audio ATC counter 906 is equivalent to a value of an ATS added to a second sub audio packet data input to the second source depacketizer 907, the second source depacketizer 907 depacketizes the second sub audio packet data and outputs the depacketized sub audio data. The depacketized sub audio data output from the second source depacketizer 907 may be sent to a buffer (not shown).

The demultiplexer 908 demultiplexes the depacketized mainstream data containing a decoding time stamp (DTS) and presentation time stamp (PTS) and sends the demultiplexed data to the mainstream decoder 909. The demultiplexed mainstream data output from the demultiplexer 908 is buffered by a decoding buffer (not shown) before the demultiplexed mainstream data is input to the mainstream decoder 909.

The mainstream STC counter 910 operates at 90 kHz or 27 MHz. The mainstream STC counter 910 is set based on program clock reference (PCR) information (not shown) contained in the packet data, and controls a value of the packet data obtained at an instant of time when the packet data is input to the decoding buffer based on the PCR value contained in the packet data.

The set mainstream STC counter 910 controls the demultiplexed mainstream data to be input to the mainstream decoder 909 at a DTS time specified in the DTS information and decoded by the mainstream decoder 909.

The decoded mainstream data output from the mainstream decoder 909 is input to the graphics processor 913 at a PTS time specified in the PTS information. The decoded mainstream data is processed by the graphics processor 913, and output.

The operation of the mainstream STC counter 910 is similar to that of the mainstream ATC counter 905. That is, the mainstream STC counter 910 is initialized based on the PCR information and starts counting at the same time.

The mainstream decoder 909 decodes the demultiplexed mainstream data and transmits the decoded result to the graphics processor 913 when a counting value of the mainstream STC counter 910 is equivalent to a value of a DTS of packet data. Also, the graphics processor 913 processes the received decoding result and outputs a processing result to a screen (not shown) when the counting value of the mainstream STC counter 910 is equivalent to a value of the PTS contained in the packet data.

The operations of the sub audio STC counter 911 and the sub audio decoder 912 are similar to those of the mainstream STC counter 910 and the mainstream decoder 909.

The sub audio STC counter 911 operates at 90 kHz or 27 MHz, and controls a value of the depacketized sub audio data that is input to a decoding buffer, which temporarily stores data, based on a PCR value contained in the packet data.

The set sub audio STC counter 911 controls the depacketized sub audio data to be input to the sub audio decoder 912 at a PTS time specified in the PTS information and decoded by the sub audio decoder 912.

The operation of the sub audio STC counter 911 is similar to that of the mainstream STC counter 910. That is, the sub audio STC counter 911 is initialized based on PCR information contained in the packet data and starts counting at the same time.

The sub audio decoder 912 decodes the depacketized sub audio data when a counting value of the sub audio STC counter 911 is equal to a PTS value included in the packet data. The sub audio data is decoded and output to the screen without performing additional processing on the sub audio data.

Figure 9:
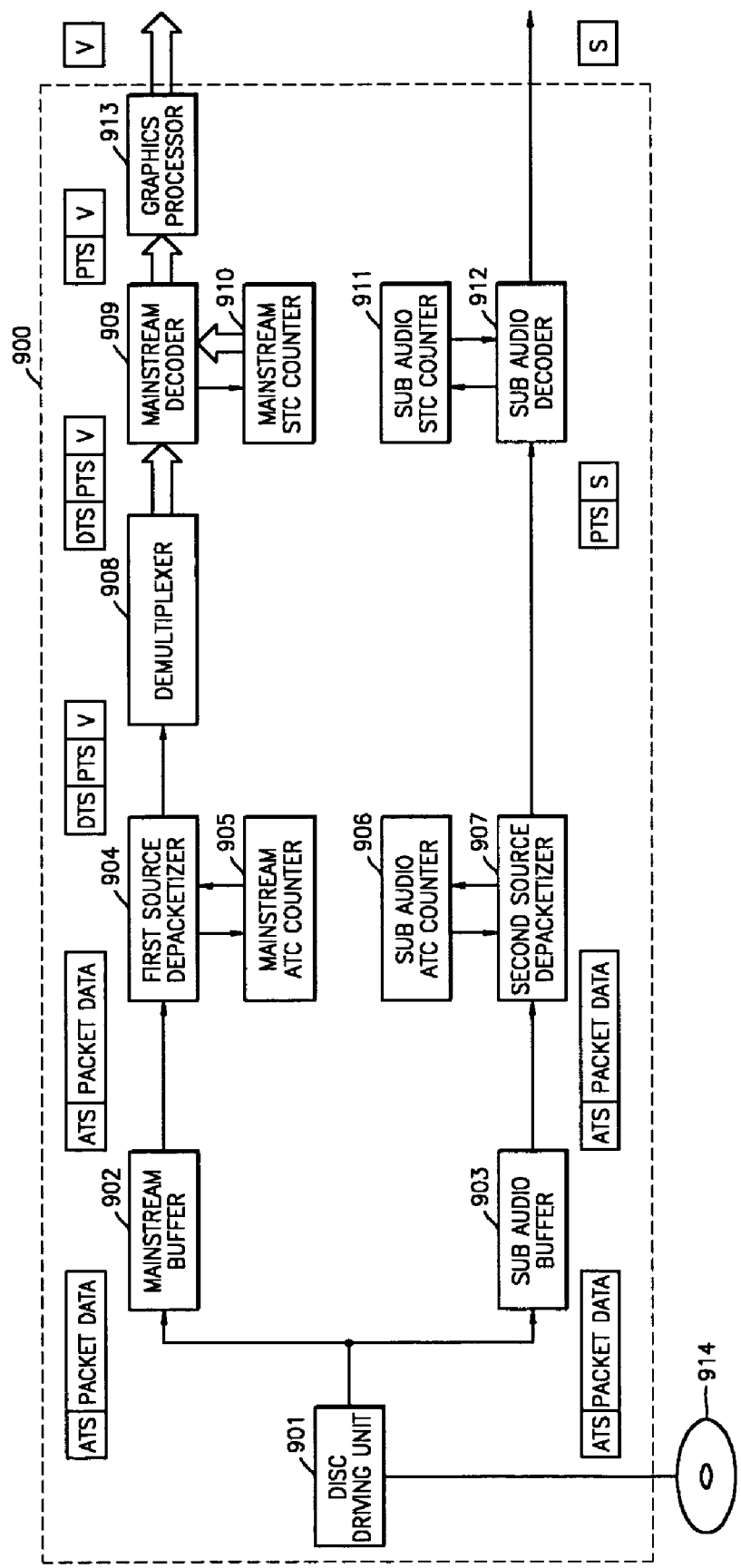
FIG. 9 is a detailed block diagram of the reproducing apparatus of FIG. 8.
Figure 10:
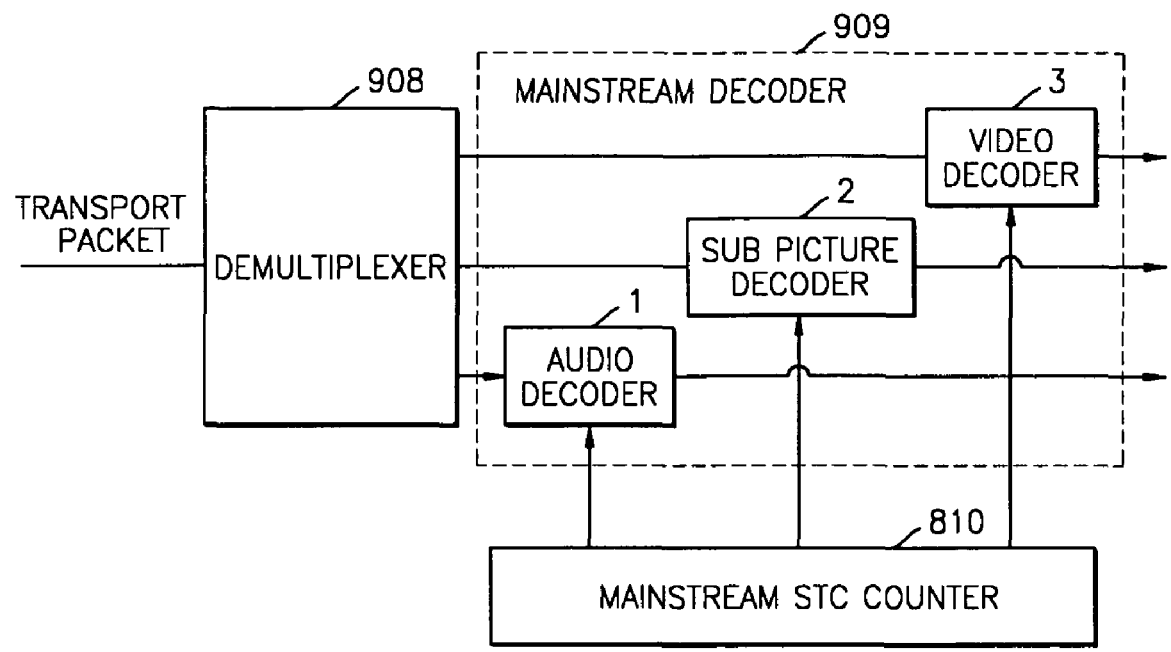
FIG. 10 is a detailed block diagram of a mainstream decoder shown in FIG. 9.

FIG. 10 illustrates in detail the mainstream decoder 909 of FIG. 9. The mainstream decoder 909 includes an audio decoder 1 that decodes audio data, a sub picture decoder 2 that decodes sub picture data, and a video decoder 3 that decodes video data. Mainstream data of an application of still image data, such as a browsable slide show, may include video data, i.e., still image data, and sub picture data such as subtitles, but the mainstream data does not include audio data. Accordingly, the audio decoder 1 is not used in the browsable slide show application.

The audio decoder 1, the sub picture decoder 2, and the video decoder 3 decode audio data, sub picture data, and video data respectively, based on a counting value of the mainstream STC counter 910 of FIG. 9.

Figure 11:
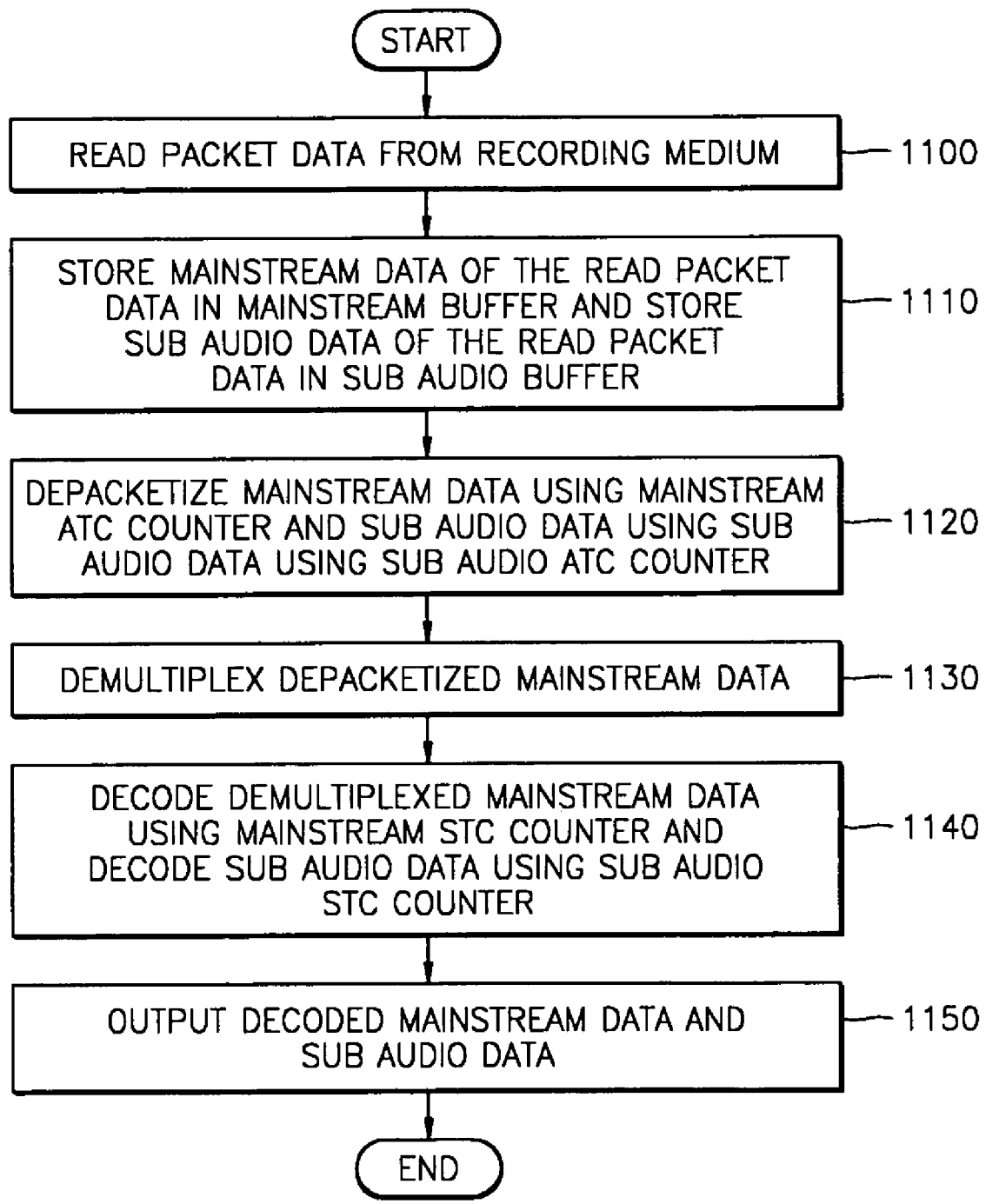
FIG. 11 is a flowchart illustrating a method of reproducing still image data, according to an embodiment of the present invention.

FIG. 11 is a flowchart illustrating a method of reproducing still picture data with separately added sub-audio data, according to an embodiment of the present invention. Referring to FIGS. 9 and 11, the disc driving unit 901 reads packet data from the recording medium 914 (operation 1100).

Mainstream data of the read packet data, which includes still image data, is stored in the mainstream buffer 902 and sub audio data of the read packet data is stored in the sub audio buffer 903 (operation 1110).

Next, the first source depacketizer 904 depacketizes the mainstream data based on a counting value of the mainstream ATC counter 905, and the second source depacketizer 907 depacketizes the sub audio data based on a counting value of the sub audio ATC counter 906 (operation 1120).

Next, the demultiplexer 908 demultiplexes the mainstream data depacketized by the first source depacketizer 904 (operation 1130).

Next, the mainstream decoder 909 decodes the demultiplexed mainstream data based on a counting value of the mainstream STC counter 910, and the sub audio decoder 912 decodes the depacketized sub audio data based on a counting value of the sub audio STC counter 911 (operation 1140).

Next, the decoded mainstream data and sub audio data are output (operation 1150).

The method of FIG. 11 can be embodied as a computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

As described above, according to the present invention, it is possible to more naturally reproduce still image data, such as a browsable slide show, to which sub audio data is separately added, using a clock for mainstream data and a clock for sub audio data, thereby preventing an interruption in reproduction of sub audio data such as background music even during a forward or reverse play.

Although a few embodiments of the present invention have been shown and described, it would be appreciated by those skilled in the art that changes may be made in this embodiment without departing from the principles and spirit of the invention, the scope of which is defined in the claims and their equivalents.

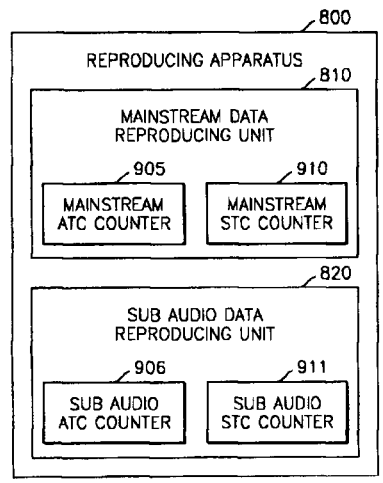

What is claimed is:
1. A reproducing apparatus, comprising:
a mainstream data reproducing unit configured to reproduce mainstream data using a mainstream arrival time clock which is configured to be used to depacketize the mainstream data and a mainstream system time clock which is configured to be used to decode the depacketized mainstream data; and an audio data reproducing unit configured to reproduce audio data corresponding to the mainstream data, using an audio arrival time clock which is configured to be used to depacketize the audio data and is independent of the mainstream arrival time clock and an audio system time clock which is configured to be used to decode the depacketized audio data and is independent of the mainstream system time clock, wherein the mainstream data reproducing unit and the audio data reproducing unit are independent such that the mainstream data is changeable by a user, while not interrupting the audio presentation, and wherein the mainstream arrival time clock is initialized based on an arrival time stamp value of a first packet of the mainstream data, and the audio arrival time clock is initialized based on an arrival time stamp value of a first packet of the audio data.

2. The apparatus of claim 1, wherein the mainstream data is changeable by the user using a skip next operation or a skip back operation.

3. The apparatus of claim 1, wherein:

the mainstream data reproducing unit comprises:
   a mainstream data decoder configured to decode the mainstream data; and
   the mainstream System Time Clock configured to provide a clock used in decoding the mainstream data with the mainstream data decoder; and the audio reproducing unit comprises:
   an audio data decoder configured to decode the audio data; and
   the audio System Time Clock configured to provide a clock used in decoding the audio data with the audio decoder.

4. A reproducing method, comprising:

reproducing mainstream data using a mainstream arrival time clock which is configured to be used to depacketize the mainstream data and a mainstream system time clock which is configured to be used to decode the depacketized mainstream data; and reproducing audio data corresponding to the mainstream data, using an audio arrival time clock which is configured to be used to depacketize the audio data and is independent of the mainstream arrival time clock and an audio system time clock which is configured to be used to decode the depacketized audio data and is independent of the mainstream system time clock, wherein the mainstream data reproducing process and the audio data reproducing process are independent such that the mainstream data is changeable by a user, while not interrupting the audio presentation, wherein the mainstream arrival time clock is initialized based on an arrival time stamp value of a first packet of the mainstream data, and the audio arrival time clock is initialized based on an arrival time stamp value of a first packet of the audio data.

5. The method of claim 4, wherein the mainstream data is changeable by a user using a skip next operation or a skip back operation.

6. A reproducing apparatus, comprising:

a mainstream data reproducing unit configured to reproduce mainstream data using a mainstream arrival time clock which is configured to be used to depacketize the mainstream data and a mainstream system time clock which is configured to be used to decode the depacketized mainstream data; and an audio data reproducing unit configured to reproduce audio data corresponding to the mainstream data, using an audio arrival time clock which is configured to be used to depacketize the audio data and is independent of the mainstream arrival time clock and an audio system time clock which is configured to be used to decode the depacketized audio data and is independent of the mainstream system time clock, wherein the mainstream data reproducing unit and the audio data reproducing unit are independent such that the mainstream data is changeable by a user, while not interrupting the audio presentation, and wherein the mainstream system time clock is initialized based on a time value of a predetermined packet of the mainstream data, and the audio system time clock is initialized based on a time value of a predetermined packet of the audio data.

7. The reproducing apparatus of claim 6, wherein the time value is a program clock reference.

* * * * *

UNITED STATES PATENT AND TRADEMARK OFFICE
CERTIFICATE OF CORRECTION

| | | |
|---|---|---|
| PATENT NO. | : 8,233,780 B2 | |
| APPLICATION NO. | : 11/435872 | |
| DATED | : July 31, 2012 | |
| INVENTOR(S) | : Kil-soo Jung et al. | |

It is certified that error appears in the above-identified patent and that said Letters Patent is hereby corrected as shown below:

Cols. 11-12, lines 23-42;
Delete claims 3-7 and insert the following claims 3-6 in their place:

--3. A reproducing method, comprising:
reproducing mainstream data using a mainstream arrival time clock which is configured to be used to depacketize the mainstream data and a mainstream system time clock which is configured to be used to decode the depacketized mainstream data; and
reproducing audio data corresponding to the mainstream data, using an audio arrival time clock which is configured to be used to depacketize the audio data and is independent of the mainstream arrival time clock and an audio system time clock which is configured to be used to decode the depacketized audio data and is independent of the mainstream system time clock,
wherein the mainstream data reproducing process and the audio data reproducing process are independent such that the mainstream data is changeable by a user, while not interrupting the audio presentation,
wherein the mainstream arrival time clock is initialized based on an arrival time stamp value of a first packet of the mainstream data, and the audio arrival time clock is initialized based on an arrival time stamp value of a first packet of the audio data.

4. The method of claim 3, wherein the mainstream data is changeable by a user using a skip next operation or a skip back operation.

5. A reproducing apparatus, comprising:
a mainstream data reproducing unit configured to reproduce mainstream data using a mainstream arrival time clock which is configured to be used to depacketize the mainstream data and a mainstream system time clock which is configured to be used to decode the depacketized mainstream data; and
an audio data reproducing unit configured to reproduce audio data corresponding to the mainstream data, using an audio arrival time clock which is configured to be used to depacketize the audio data and is independent of the mainstream arrival time clock and an audio system time clock Signed and Sealed this
Eighteenth Day of September, 2012

David J. Kappos
*Director of the United States Patent and Trademark Office* which is configured to be used to decode the depacketized audio data and is independent of the mainstream system time clock, wherein the mainstream data reproducing unit and the audio data reproducing unit are independent such that the mainstream data is changeable by a user, while not interrupting the audio presentation, and wherein the mainstream system time clock is initialized based on a time value of a predetermined packet of the mainstream data, and the audio system time clock is initialized based on a time value of a predetermined packet of the audio data.

6. The reproducing apparatus of claim 5, wherein the time value is a program clock reference.--

UNITED STATES PATENT AND TRADEMARK OFFICE
CERTIFICATE OF CORRECTION

PATENT NO. : 8,233,780 B2
APPLICATION NO. : 11/435872
DATED : July 31, 2012
INVENTOR(S) : Kil-soo Jung et al.

It is certified that error appears in the above-identified patent and that said Letters Patent is hereby corrected as shown below:

Delete the title page and substitute therefore the attached title page showing the corrected number of claims in patent.

Cols. 11-12, lines 23-42;
Delete claims 3-7 and insert the following claims 3-6 in their place:

--3. A reproducing method, comprising:
reproducing mainstream data using a mainstream arrival time clock which is configured to be used to depacketize the mainstream data and a mainstream system time clock which is configured to be used to decode the depacketized mainstream data; and
reproducing audio data corresponding to the mainstream data, using an audio arrival time clock which is configured to be used to depacketize the audio data and is independent of the mainstream arrival time clock and an audio system time clock which is configured to be used to decode the depacketized audio data and is independent of the mainstream system time clock,
wherein the mainstream data reproducing process and the audio data reproducing process are independent such that the mainstream data is changeable by a user, while not interrupting the audio presentation,
wherein the mainstream arrival time clock is initialized based on an arrival time stamp value of a first packet of the mainstream data, and the audio arrival time clock is initialized based on an arrival time stamp value of a first packet of the audio data.

4. The method of claim 3, wherein the mainstream data is changeable by a user using a skip next operation or a skip back operation.

This certificate supersedes the Certificate of Correction issued September 18, 2012.

Signed and Sealed this
Ninth Day of October, 2012

David J. Kappos
*Director of the United States Patent and Trademark Office*

5. A reproducing apparatus, comprising:

a mainstream data reproducing unit configured to reproduce mainstream data using a mainstream arrival time clock which is configured to be used to depacketize the mainstream data and a mainstream system time clock which is configured to be used to decode the depacketized mainstream data; and an audio data reproducing unit configured to reproduce audio data corresponding to the mainstream data, using an audio arrival time clock which is configured to be used to depacketize the audio data and is independent of the mainstream arrival time clock and an audio system time clock which is configured to be used to decode the depacketized audio data and is independent of the mainstream system time clock, wherein the mainstream data reproducing unit and the audio data reproducing unit are independent such that the mainstream data is changeable by a user, while not interrupting the audio presentation, and wherein the mainstream system time clock is initialized based on a time value of a predetermined packet of the mainstream data, and the audio system time clock is initialized based on a time value of a predetermined packet of the audio data.

6. The reproducing apparatus of claim 5, wherein the time value is a program clock reference.--

CERTIFICATE OF CORRECTION (continued)

(12) United States Patent
Jung et al.

(10) Patent No.: US 8,233,780 B2
(45) Date of Patent: Jul. 31, 2012

(54) REPRODUCING APPARATUS AND METHOD, AND RECORDING MEDIUM

(75) Inventors: Kil-soo Jung, Gyeonggi-do (KR); Seong-jin Moon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1029 days.

(21) Appl. No.: 11/435,872

(22) Filed: May 18, 2006

(65) Prior Publication Data

US 2006/0203296 A1    Sep. 14, 2006

Related U.S. Application Data

(63) Continuation of application No. 10/791,284, filed on Mar. 3, 2004.

(60) Provisional application No. 60/458,436, filed on Mar. 31, 2003.

(30) Foreign Application Priority Data

| Mar. 28, 2003 | (KR) | 2003-19684 |
| Nov. 19, 2003 | (KR) | 2003-82336 |

(51) Int. Cl.
| *H04N 5/92* | (2006.01) |
| *H04N 1/00* | (2006.01) |
| *H04N 5/78* | (2006.01) |
| *H04N 5/84* | (2006.01) |
| *H04N 5/928* | (2006.01) |
| *G06F 1/00* | (2006.01) |
| *G06F 9/26* | (2006.01) |
| *G06F 12/02* | (2006.01) |
| *G06F 13/00* | (2006.01) |

(52) U.S. Cl. ........ 386/337; 386/324; 386/334; 386/338; 386/339; 345/565; 358/426.12; 711/103; 711/156; 711/166; 711/168; 711/219; 713/501

(58) Field of Classification Search .............. 386/98, 386/95, 96, 104, 126, E9.013, E9.017, E9.04; 348/E13.04, E13.059, E13.073, E5.011, E5.108; 358/426.12; 375/E7.271; 713/501; 345/512, 345/515, 565; 711/103, 156, 166, 168, 219
See application file for complete search history.

(56) References Cited

U.S. PATENT DOCUMENTS 5,966,496 A    10/1999    Takimoto
(Continued)

FOREIGN PATENT DOCUMENTS

EP    1 041 566    10/2000
(Continued)

OTHER PUBLICATIONS

Office Action issued in corresponding Japanese Patent Application No. 2006-507774 dated Nov. 13, 2007.

(Continued)

*Primary Examiner* — Thai Tran
*Assistant Examiner* — Syed Hasan
(74) *Attorney, Agent, or Firm* — NSIP Law

(57) ABSTRACT

A reproducing apparatus and method includes a reproducing unit to reproduce mainstream data and sub audio data separately added in the mainstream data, wherein the reproducing unit comprises a counter used in reproducing the sub audio data. Accordingly, it is possible to more naturally reproduce still image data, such as a browsable slide show, to which sub audio data is additionally included, thus preventing an interruption in reproduction of the sub audio data even during a forward or reverse play.

6 Claims, 9 Drawing Sheets